United States Patent [19]

Underhill et al.

[11] Patent Number: 5,581,974
[45] Date of Patent: Dec. 10, 1996

[54] DUAL PURPOSE CUTTING APPARATUS FOR ROUND BALE

[75] Inventors: Kenneth R. Underhill, Strasburg; Bryant F. Webb, Ephrata, both of Pa.

[73] Assignee: New Holland North America, Inc., New Holland, Pa.

[21] Appl. No.: 538,112

[22] Filed: Oct. 2, 1995

[51] Int. Cl.$^6$ .................... B65B 11/58; B65B 27/12; B65B 63/04
[52] U.S. Cl. .................... 53/118; 53/389.3; 53/587; 53/176
[58] Field of Search .................... 53/399, 441, 556, 53/430, 118, 389.3, 587, 176, 449

[56] References Cited

U.S. PATENT DOCUMENTS

| | | | |
|---|---|---|---|
| 4,176,596 | 12/1979 | Sacht | 100/88 |
| 4,212,149 | 7/1980 | Krone et al. | 56/341 |
| 4,580,398 | 4/1986 | Bruer et al. | 56/341 |
| 4,599,844 | 7/1986 | Clostermeyer et al. | 53/118 |
| 4,610,123 | 9/1986 | Krone et al. | 53/118 |
| 4,677,807 | 7/1987 | Verhulst et al. | 53/176 X |
| 4,956,968 | 9/1990 | Underhill | 53/341 |
| 5,129,208 | 7/1992 | Van Zee | 53/587 X |
| 5,184,545 | 2/1993 | Jennings et al. | 100/5 |
| 5,231,828 | 8/1993 | Swearingen et al. | 56/341 |
| 5,243,806 | 9/1993 | Jennings et al. | 53/118 |
| 5,450,704 | 9/1995 | Clostermeyer | 53/118 |

*Primary Examiner*—Linda Johnson
*Attorney, Agent, or Firm*—Frank A. Seemar; Larry W. Miller

[57] ABSTRACT

A round baler having a main frame including opposing sidewalls, and an apron assembly comprising crop engaging elements disposed between said sidewalls for defining a bale forming chamber having a generally cylindrical shape with a transverse inlet. The crop engaging elements move along a path having an inner course contiguous with a major portion of the fixed periphery of the cylindrical chamber. The baler also includes a pickup assembly for feeding crop material to the chamber through the inlet whereby crop material accumulated in the chamber is engaged by the crop engaging elements and formed into a compacted cylindrical package. A supply of net material is selectively dispensed via a dispensing assembly into the chamber for wrapping the periphery of the formed cylindrical package of crop material in the chamber. A supply of twine fed to a twine dispensing assembly is also selectively dispensed into the chamber for wrapping the periphery of the cylindrical package of crop material. Cutting means is adapted to sever the net under conditions where the twine is being dispensed into the chamber.

6 Claims, 7 Drawing Sheets

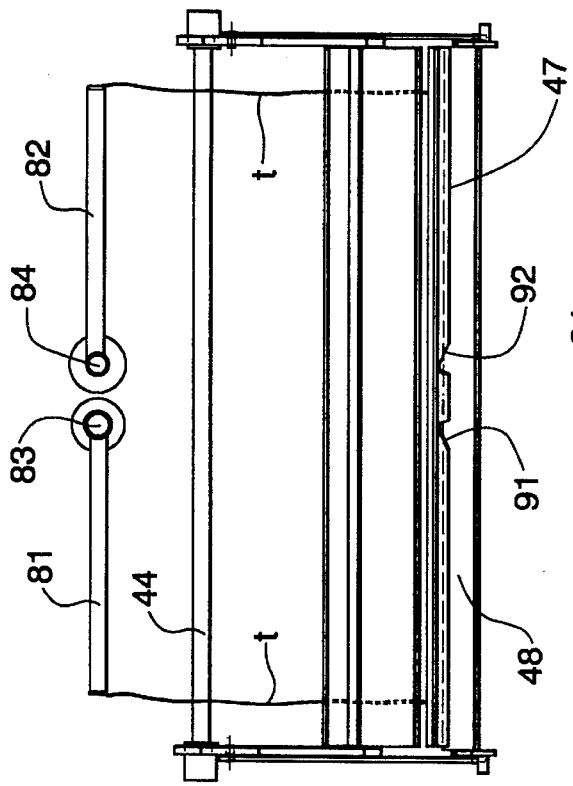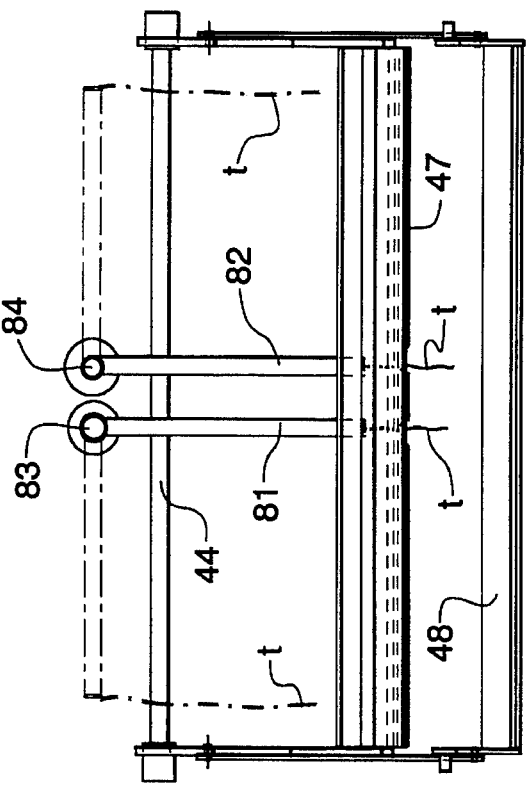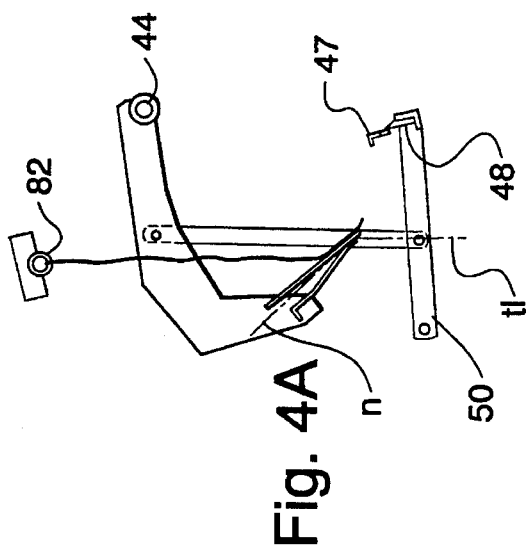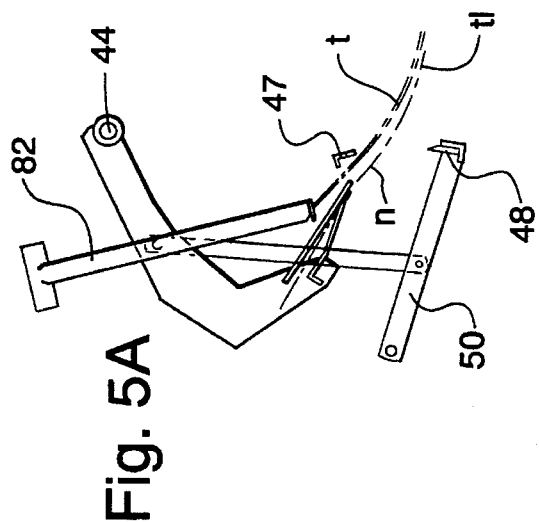

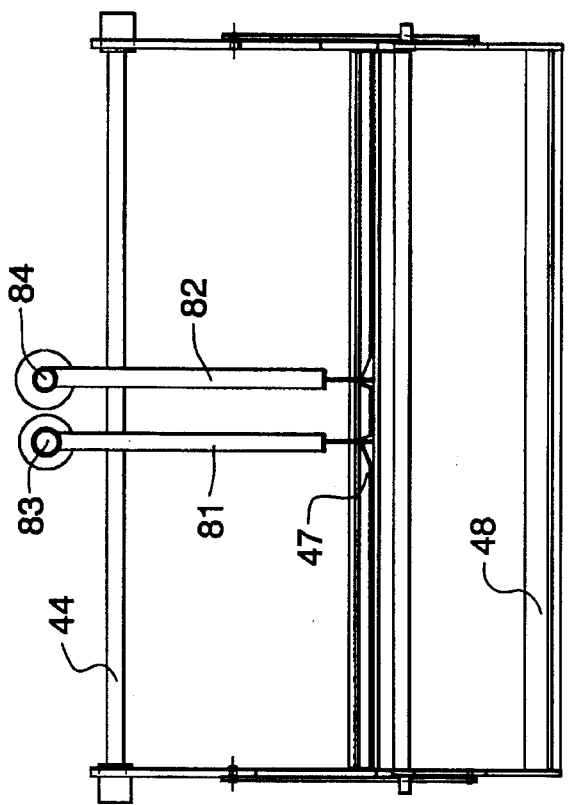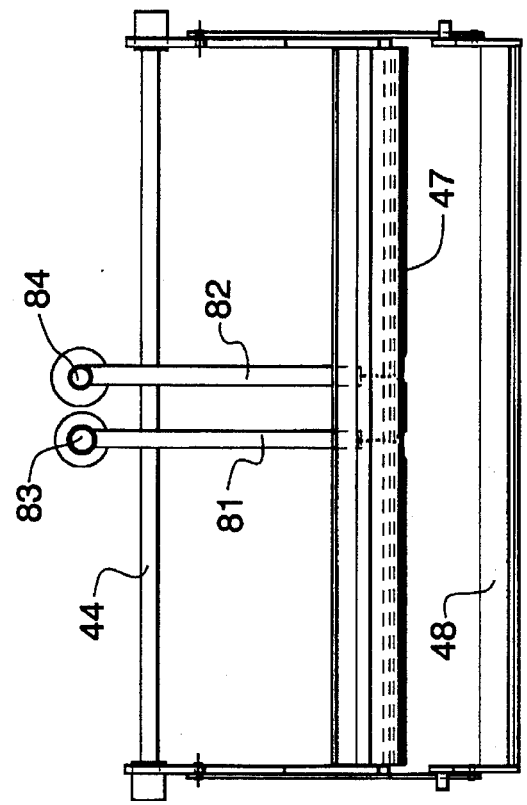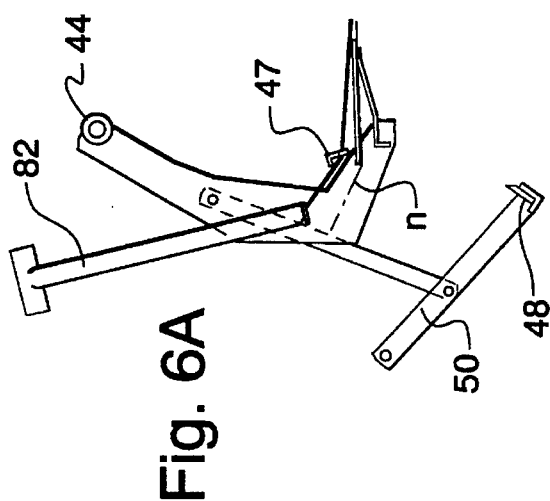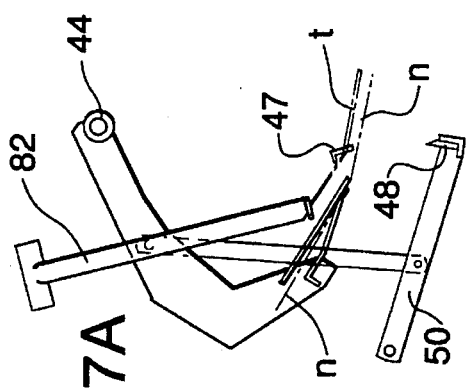

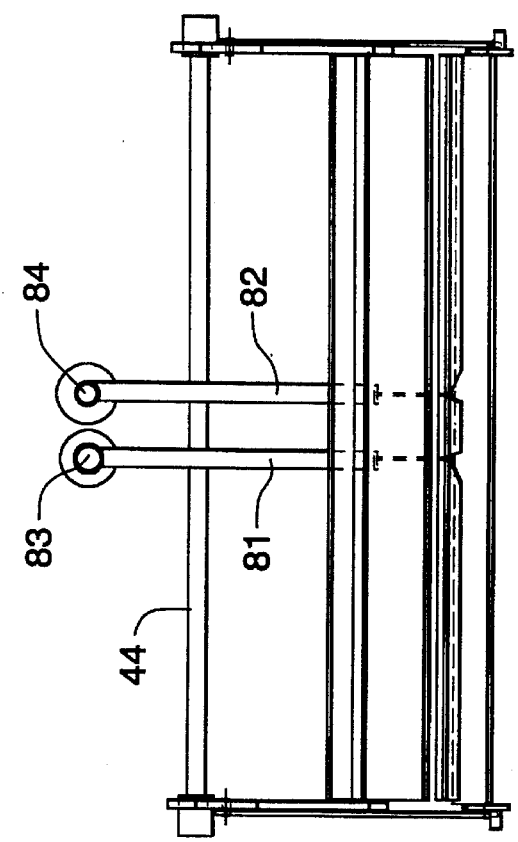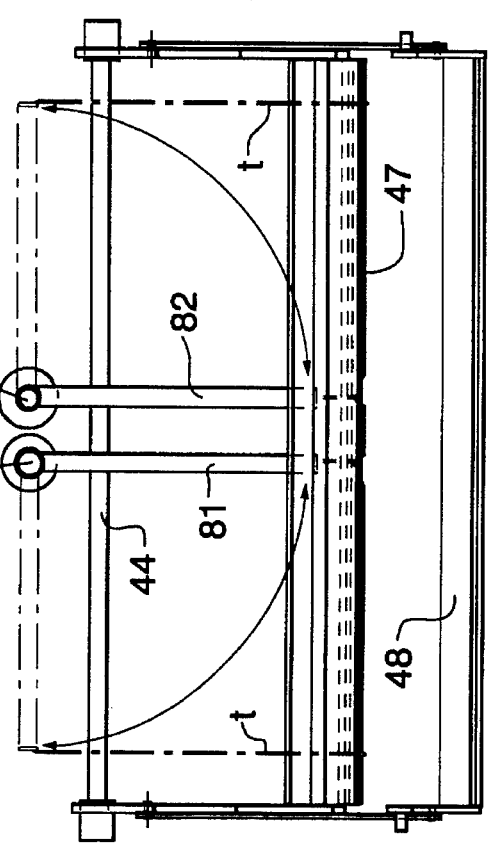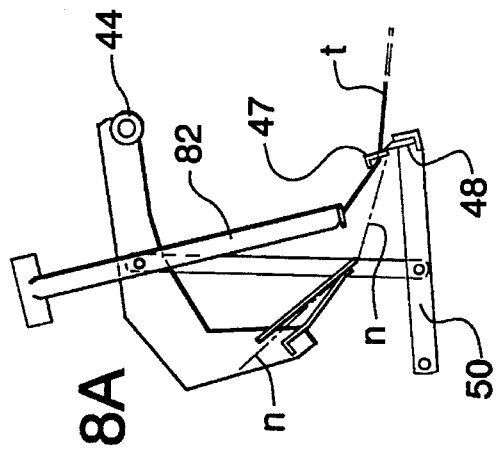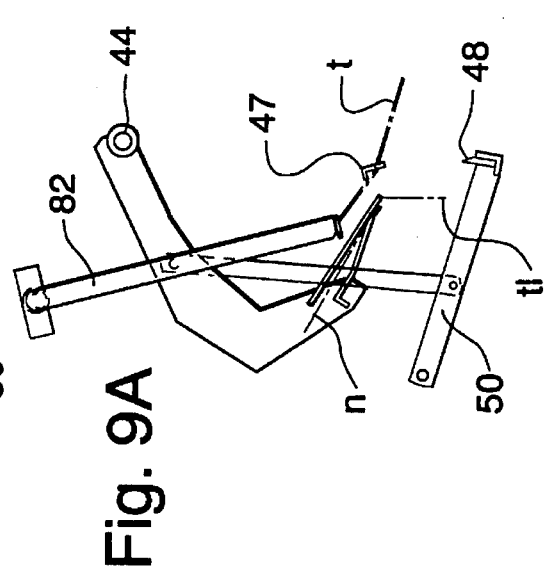

DUAL PURPOSE CUTTING APPARATUS FOR ROUND BALE

RELATED APPLICATIONS

This application incorporates by reference the disclosure of the concurrently filed U.S. patent application Ser. No. 08/537,019 entitled Apparatus For Making Round Bales and assigned to the same assignee as this application.

FIELD OF THE INVENTION

This invention relates generally to apparatus for making cylindrical bales of crop material, commonly referred to as a round baler. More particularly, this invention pertains to the cutting mechanism portion of the wrapping assembly for wrapping crop material that has been formed into a cylindrical package in a round baler.

BACKGROUND OF THE INVENTION

Prior art balers generally have a bale forming chamber defined by an apron comprising an array of side-by-side belts, transverse slats trained on chains, a plurality of rolls or a combination of these various elements, e.g., rolls and belts. Crop material, such as hay, is picked up from the ground as the baler traverses the field, fed into a fixed or variable chamber where it is accumulated and compressed to form a cylindrical package of crop material. The formed package, while in its compacted condition inside the chamber, is wrapped with net, plastic film, twine or the like, to produce a completed round bale that is then ejected from the chamber onto the ground for subsequent handling.

Exemplary of prior art round balers of the type referred to above having a fixed chamber, i.e., a bale forming chamber that does not vary in size, are the various balers disclosed in U.S. Pat. Nos. 4,176,596, issued Dec. 4, 1979 in the name of Hans O. Sacht, 4,212,149, issued Jul. 15, 1980 in the name of Bernard Krone et al, and 4,599,844, issued Jul. 15, 1986 in the name of Gerhard Clostermeyer et al, each of which illustrates a different type of apron assembly. In U.S. Pat. No. 4,176,596 a baler is disclosed in which the bale forming chamber is defined by a plurality of similar groups of side-by-side conveyor belts arranged around the periphery of the chamber. The conveyor comprises a pair of opposing chains between which a plurality of parallel crop engaging slats are mounted. The chamber in U.S. Pat. No. 4,212,149 is defined by a continuous slatted conveyor in combinations with a pair of floor rolls, in which an inner run of the conveyor is guided along a fixed path along a major portion of the periphery of the chamber. A third type of apron assembly, shown in U.S. Pat. No. 4,599,844, consists of a plurality of adjacent rolls arranged transversely in a generally circular array to define a cylindrical chamber.

Various wrapping systems employ known wrapping materials, such as net or twine, to wrap compacted packages of crop material formed in round balers. For example, the Sacht and Krone et al patents, mentioned above, refer to commonly accepted twine wrapping systems for completing bales formed in fixed chamber balers. In another patent, also directed to a fixed chamber round baler, where the chamber is defined by transverse slats mounted on chains, U.S. Pat. No. 4,610,123, issued Sep. 9, 1986 in the name of Bernard Krone et al, a net wrapping system is disclosed. In this baler the net is introduced into the fixed chamber via the transverse inlet through which crop material is fed. In still another fixed chamber baler patent, U.S. Pat. No. 5,231,828, issued Aug. 3, 1993 in the name of John R. Swearingen et al, a wrapping system is disclosed in which net, twine or plastic can be separately applied to a completed cylindrical package via the crop inlet.

In the wrapping system disclosed in the Clostermeyer et al patent, mentioned above, net is introduced into the forming chamber via a path between a pair of adjacent rolls in the circular array defining the chamber. Another example of this is illustrated in U.S. Pat. No. 4,580,398, issued Apr. 8, 1996 in the name of Dirk Bruer et al.

Although both twine wrapped and net wrapped bales are common and readily acceptable, many farmers prefer to use net for various reasons, e.g., less losses in certain crop conditions, a smoother outer surface on the completed bale which gives added protection against rain, and reduced field time for wrapping due to the reduced number of revolutions of the completed package in comparison to twine wrapping. Regardless of the wrapping medium, in a fixed chamber baler, as in most variable chamber balers, initiation of the wrapping step is not commenced until a cylindrical package of crop material has been fully formed and compacted in the chamber at which time the tail of the twine or net is introduced to the chamber between the forming elements of the apron or through the crop inlet. The twine or net is retained between the outer surface of the compacted cylindrical package of crop material and the apron, and due to frictional force the wrapping material encases or encircles the package as it continues to rotate in the chamber. Finally, the wrapping process is completed, the net or twine is severed, and a completed bale is discharged from the chamber.

As mentioned above one of the principal advantages of net wrapping is the ability to reduce wrapping time. This is accomplished by limiting the number of revolutions of the completed package in the chamber during wrapping which is a significant contribution to reduction of the overall elapsed time in the bale forming process as compared to twine where ten times that number would not be uncommon, depending on crop material and bale size. However, in some crop conditions, achieving this advantage, along with the other important advantages of net wrapped bales, is impacted by the necessity to wrap twine around a net wrapped bale to hold the net in place. This type of dual wrapping operation is especially prevalent when baling moist slippery crop material such as silage. In known apparatus, a common approach is the utilization of a subsequent, time consuming twine wrapping operation, i.e., additional revolutions of the completed bale either in the chamber or after discharge, requiring the attendant expenditure of time and effort.

SUMMARY OF THE INVENTION

An important object of the present invention is to provide improved dual wrapping apparatus for a round baler that enhances its ability to reduce time for yielding the ultimate product without affecting reliability and thereby improve overall performance.

In pursuance of this and other important objects the present invention provides for new and unique improvements to a round baler for forming crop material into dual wrapped cylindrical bales, comprising a main frame, opposing sidewalls, means defining a bale forming chamber having a generally cylindrical shape with a transverse inlet, the defining means including an apron assembly comprising crop engaging means disposed between the sidewalls, means for supporting the apron assembly on the main frame, means for moving the crop engaging means along a path contiguous with a portion of the periphery of the cylindrical chamber, and means for feeding crop material to the chamber through the inlet whereby the crop material accumulated in the chamber is engaged by the crop engaging means under conditions where the crop material engaging means are moving along a portion of the periphery to engage the crop material and form it into a compacted cylindrical package in the chamber. The baler further comprises a supply of net material, and a dispensing assembly for dispensing the net material into the chamber for wrapping the periphery of the cylindrical package of crop material to form a round bale of crop material. More particularly, the invention contemplates an improvement whereby a supply of twine is also provided along with a twine dispensing assembly for selectively dispensing the twine into the chamber for wrapping the periphery of the cylindrical package of crop material to form a dual wrapped round bale of crop material, and means for cutting the net material under conditions where the twine is being dispensed into the chamber.

The foregoing and other objects, features and advantages of the invention will appear more fully hereinafter from a consideration of the detailed description which follows, in conjunction with the accompanying sheets of drawings wherein one principal embodiment of the invention embodied in a fixed chamber round baler is illustrated by way of example. It is to be expressly understood, however, that the drawings are for illustrative purposes and are not to be construed as defining the limits of the invention, e.g., the invention is readily adaptable to variable chamber round balers.

DESCRIPTION OF THE DRAWINGS

FIGS. 4A–10A are diagrammatic side elevational views similar to FIG. 2 in which the wrapping apparatus of the present invention is shown in selected conditions during operation.

FIGS. 4B–10B are diagrammatic views similar to FIG. 3 and corresponding to counterpart views shown in FIGS. 4A–10A.

DESCRIPTION OF THE PREFERRED EMBODIMENT

Figure 1:
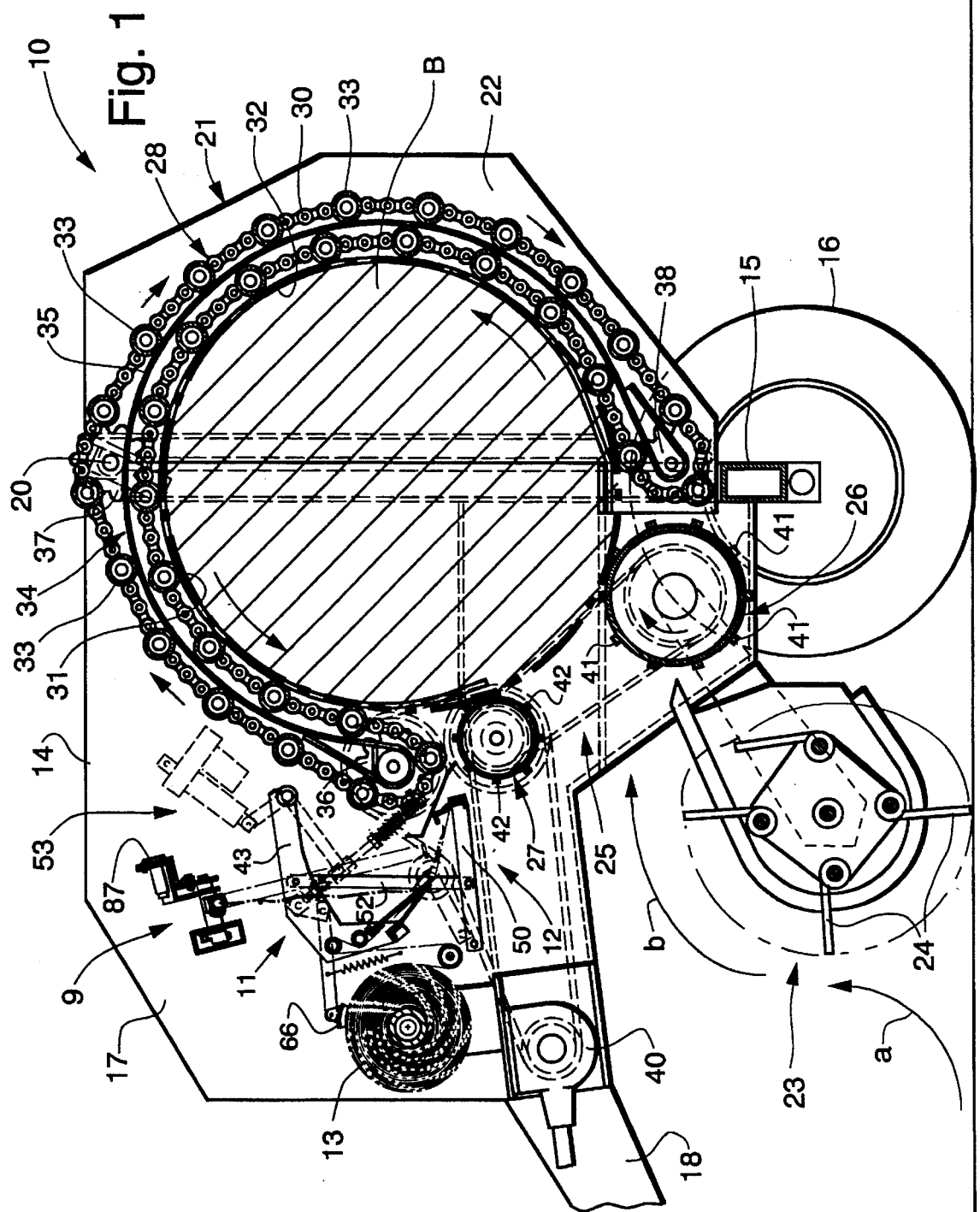
FIG. 1 is a cutaway side elevational view of a round baler in which the present invention is embodied.

Referring now to the drawings for a more detailed description of the preferred embodiment of the invention, FIG. 1 shows a fixed chamber round baler 10 of the type disclosed in U.S. Pat. No. 4,212,149, discussed above. As will become apparent from the following description, the present invention is directed to improved apparatus for wrapping a cylindrical package of crop material formed in a round baler, a typical example of which is baler 10. More particularly, the wrapping apparatus generally comprises a net dispensing assembly 11, a twine dispensing assembly 9, and a severing assembly 12 for cutting web material, such as net, issued from a supply roll 13, and for cutting twine. Net and twine dispensing can be separately or simultaneously carried out as discussed below.

Round baler 10 includes a main frame 14 with a main support beam 15 on which a pair of wheels 16 (only one shown) are rotatably affixed. The main frame includes a pair of side walls between which a cylindrical bale forming chamber extends. For the purposes of clarity only one wall 17 is shown in FIG. 1 and the elements mounted inwardly thereof are shown in full lines for clarity, which is an approach not uncommon in the descriptions in prior art patents. For illustrative purposes reference letter B is used to designate a bale, shown in cross section in the chamber.

Baler 10 also includes a tongue 18 extending from the forward portion of main frame 14 for conventional connection to a tractor. Pivotally connected to the sidewalls of main frame 14 by a pair of stub shafts 20 is tailgate 21 which may be closed, as shown throughout the drawings, during bale formation or pivoted open about stub shafts 20 to discharge a completed bale. The tailgate includes tailgate walls 22 coextensive with side walls 17. A pickup assembly 23 mounted on main frame 14 in a suitable manner includes a plurality of fingers or tines 24 moveable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on mainframe 14 between sidewalls 17.

The bale forming chamber is defined primarily by an apron assembly 28 comprising a pair of support chains 30 mounted to travel along a continuous path, the inner run of which is defined on sidewalls 17 and tailgate walls 22 by front and rear sections 31, 32 of a continuous chain guide track that separates at a point adjacent track 20 during bale discharge. The apron further comprises a plurality of parallel tubular crop engaging slats 33 extending between chains 30 to provide a cage-like periphery of the cylindrically shaped chamber. Radially outward of the inner run of apron assembly 28 are front and rear sections 34, 35 of continuous cylindrical bale chamber wall. These sections, also separable during bale discharge are mounted between side walls 17 and tailgate walls 22, respectively, for maintaining integrity between the outer and inner runs of chain 30. Operatively engaged with chain 30 are drive sprocket 26 mounted between sidewalls 17, idler sprockets 37 also mounted between sidewalls 17 on shaft 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The bale forming chamber is further defined by the outer conveying surfaces of floor roll 26 and stripper roll 27, both of which are driven in a clockwise direction by conventional drive means appropriately coupled to gear box 40. These rolls are provided with ribs 41, 42 to enhance their ability to convey crops in the chamber as a bale is being formed. Other forms of aggressive surface structure may be used to accommodate various types of crops and conditions.

Figure 2:
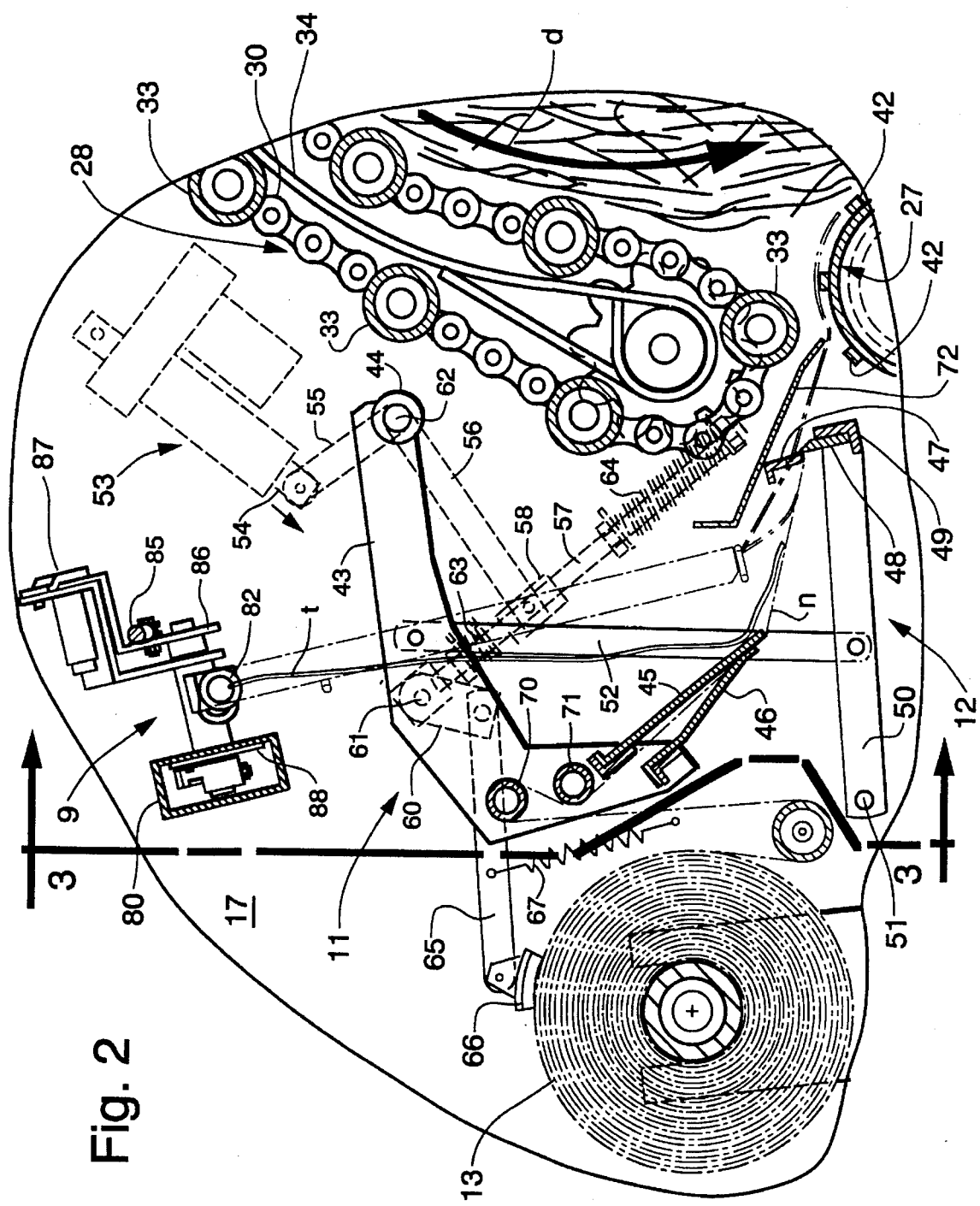
FIG. 2 is another cutaway side elevational view and shows in enlarged form the wrapping apparatus portion of the round baler of FIG. 1.
Figure 3:
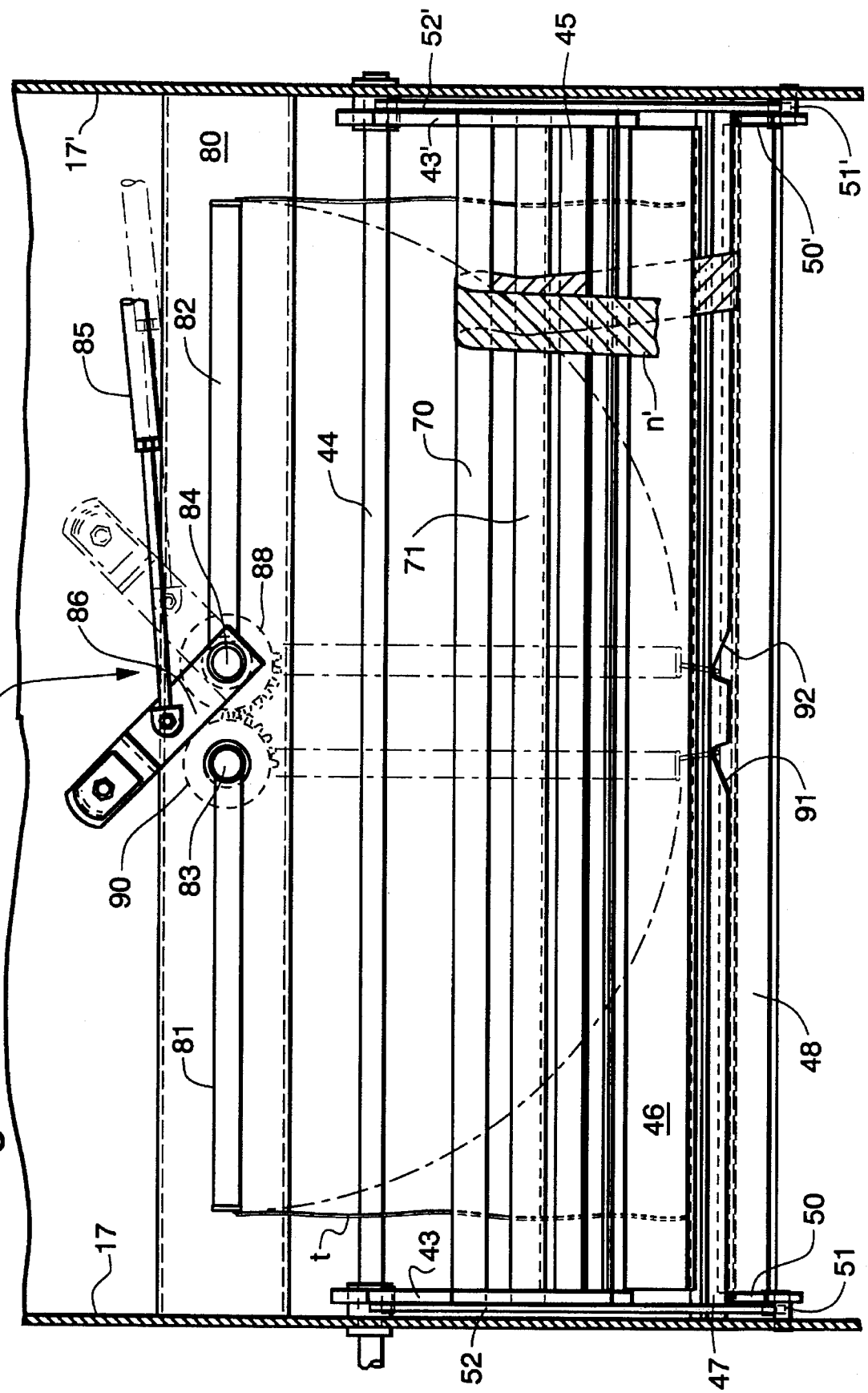
FIG. 3 is view taken along lines 3—3 in FIG. 2.

Now turning to FIGS. 2 and 3 for a more detailed description of the wrapping apparatus of the present invention which comprises net dispensing assembly 11 shown in the fully retracted position, twine dispensing assembly 9 shown in its home position, and severing assembly 12. Net dispensing assembly 11 dispenses net n from net supply roll 13, twine dispensing assembly 9 dispenses twine t from a remote supply, and severing assembly 12 is adapted to sever such net and twine.

Net dispensing assembly 11 comprises a pair of parallel frame members 43, 43' (see FIG. 3) fixedly secured to rotatably supported cross tube 44 that extends between sidewalls 17, 17' and upper and lower clamping members 45, 46, respectively, both of which have tips for grasping net n in a fashion that is clearly described in U.S. Pat. No. 4,956,968, issued Sep. 18, 1990 in the name of Kenneth R. Underhill, hereby incorporated by reference.

Severing assembly 12 comprises a shear bar 47 fixedly mounted between sidewalls 17, 17' and a transverse knife 48 affixed to a mounting member 49 extending between a pair of parallel knife support arms 50, 50' rotatably mounted at fixed pivots 51, 51' on the inside surface of sidewalls 17, 17'. Coupling links 52, 52' are pivotally attached at one end to dispensing assembly frame members 43, 43' and at its other end to knife support arms 50, 50'.

Mounted outboard of sidewall 17 is a conventional actuator assembly 53 (not shown in FIG. 3) comprising means for reciprocally driving element 54, which is pivotally attached to one end of a link 55. The other end of link 55 is fixedly attached to cross tube 44. Also fixedly attached to cross tube 44 is a link 56 which is coupled to rod 57 via a sliding yoke 58. Rod 57 has a freely swingable lower end that moves in response to the position of link 56 which determines the position of yoke 58 along its shank. Thus the upper end of rod 57, which is affixed to a leg 60, pivots about its pivot 61 in response to the swing of lever 56 about pivot 62. Cushioning springs 63, 64 absorb the impact of yoke 58 during the limits of its reciprocal traversal along rod 57.

Affixed to and pivoting with leg 60 is drag arm 65, to the outer end of which is attached drag shoe 66 held in contact with the outer surface of net supply roll 13 by spring 67. In a manner similar to that which is taught by U.S. Pat. No. 5,243,806, issued Sep. 14, 1993 in the name Richard E. Jennings et al, hereby incorporated by reference, the net is issued from supply roll 13 along a path around idler roll 68 and spreader rolls 70, 71 and thence to clamping members 45, 46. This path is illustrated by net segment n', which is shown only in FIG. 3 for diagrammatic purposes.

Referring again to FIGS. 2 and 3, twine dispensing assembly 9 is best described by first referring to and incorporating by reference U.S. Pat. No. 5,184,545, issued Feb. 9, 1993 in the name of Richard E. Jennings et al, which discloses a twine dispensing assembly of the type generally referred to by reference numeral 9 and shown mounted on a frame member 80 between sidewalls 17, 17'. The assembly includes a pair of twine arms 81, 82 shown in their home position with twine tails dangling from the ends thereof. Twine arm 81 affixed to shaft 83 is driven in a counter clockwise direction and twine arm 82 affixed to shaft 84 is driven in a clockwise direction when drive arm 85 urges the driven link 86 to the position shown in phantom outline. The downwardly extending position of twine arms 81, 82 are shown in phantom outline in the extremity of their arcuate paths. This position corresponds to the phantom position of drive arm 85 and driven link 86. A break away mechanism 87 is used for providing protection in the usual manner. The identical arcuate paths generated by the twine dispensing ends of the twine arms are maintained by the coupling between drive gear 88 and driven gear 90, both of which are affixed to associated twine arm shafts, 84, 83, respectively.

By employing appropriate electronic controls, the net and the twine dispensing assemblies may be adapted to independently cooperate separately or sequentially with severing assembly 12, which operation will become apparent in the descriptive material below. The net dispensing apparatus is the subject matter of the patent application referred to under "Related Applications". By appropriate sequencing the twine and net may also be dispensed concurrently, which is an advantage not heretofore realize by prior art balers.

Now turning first to such concurrent dispensing operation, net dispensing assembly 11, with t1 draped downwardly, moves from the fully retracted position shown in FIGS. 1, 2, 4A and 4B to its intermediate position shown in FIGS. 5A and 5B, whereupon tail t1 is likely to be drawn toward roll 27, due to air currents established by ribs 42. This is achieved when actuator element 54 is thrust outwardly, as indicated by direction arrow c, which rotates frame members 43 counter clockwise, causing net severing assembly to rotate clockwise and release the end of the net from between knife 48 and shearbar 47, if it has been held (FIGS. 2 and 3) during the formation of a compacted cylindrical package in the chamber. It should be noted, as mentioned above, that tail t may drape downwardly as shown in FIG. 4A. Regardless of its starting position, net tail t is guided and in some instances drawn toward the insertion space between roll 27 and shield element 72 as the compacted package of crop material rotates in the chamber in direction d past such space. Element 72 comprises a rigid sheet of material extending between sidewalls 17 to shield apron 28 which is moving away from the chamber. Concurrently, twine arms 81, 82 rotate to the down position with dispensing ends adjacent notches 91, 92 in shearbar 72 to permit twines t to become operatively associated with net n as it approaches the chamber.

FIGS. 6A and 6B show net dispensing assembly 11 in the fully extended position during wrapping, and twine t being fed to the central portion of the chamber through notches 91, 92. Drag shoe 66 allows net to be freely issued or in the event some drag is desirable during wrapping this shoe can be adjusted for varying frictional engagement. When tail t1 and twines t engage the surface of the cylindrical package they are pulled to the nip formed by the roll and the rotating package and thence dragged around periphery to concurrently encircle the cylindrical package of crop material.

After a desired number of wraps have been applied, e.g., one and a half, net dispensing assembly 11 is withdrawn via an intermediate position (FIGS. 7A and 7B) by retraction of actuator element 54 causing frame members 43, 43' to rotate clockwise which in turn pulls severing assembly upwardly toward net n being dispensed along a path adjacent to shearbar 47. When the fully retracted position of FIGS. 8A and 8B is attained net n is severed by knife 48 which holds the end of the net tail t against shear bar 47 as shown in FIG. 2. Knife 48 does not cut twine t which is free to continue to pay out via notches 91, 92.

Now turning to the twine spiraling function, common to twine wrapping, it takes place immediately after the net is severed, saving valuable time in the overall wrapping operation. The net dispensing assembly moves to its intermediate position (FIGS. 9A and 9B) whereupon twine arms 81, 82 reciprocate along their arcuate paths in a conventional manner to spirally apply twine to the net wrapped bale. Knife 48 has been removed from shearbar 47 giving the twine a free traversal path along the shearbar, i.e., out of the notches.

Figure 10B:
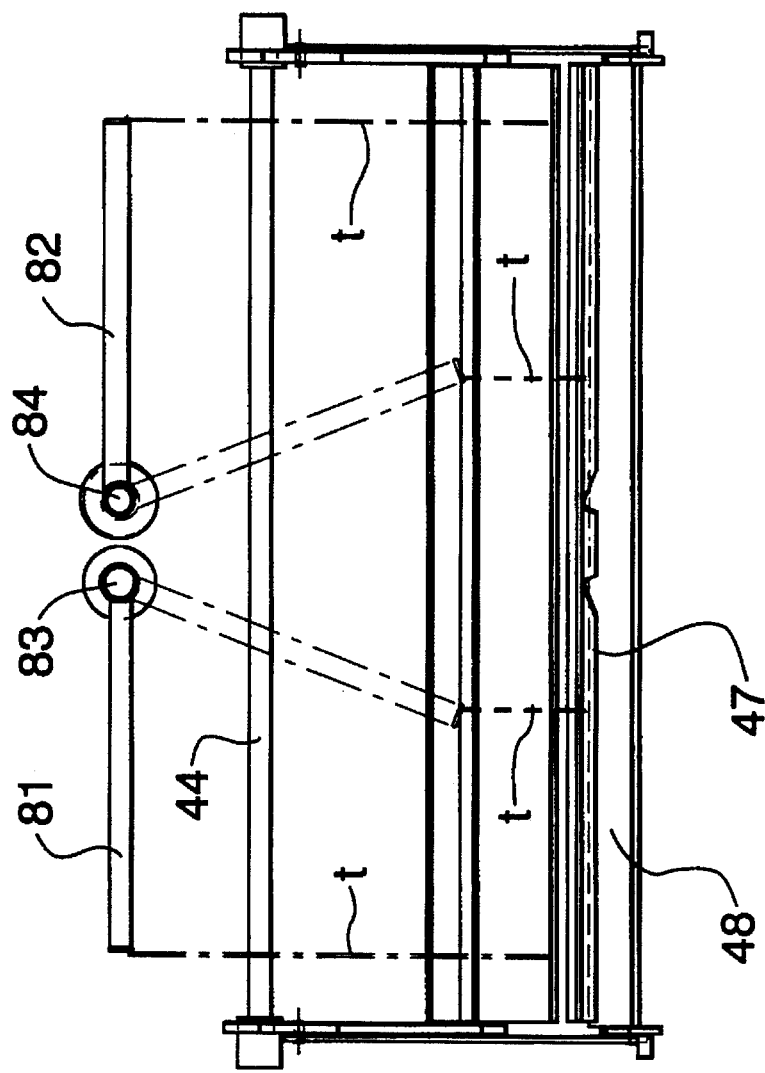
Figure 10A:
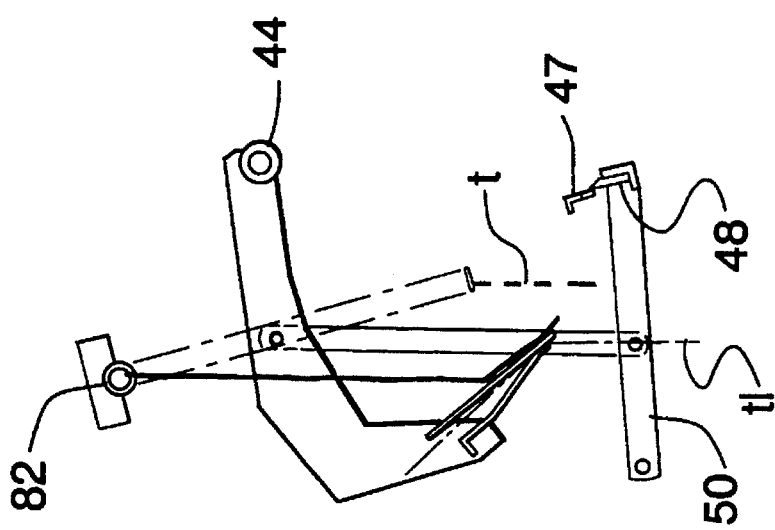

After an appropriate number of twine wraps have been applied, knife 48 is pulled against shearbar 47 to cut twine t. As shown in FIG. 10B the twine may be anywhere along the shearbar with the exception of the notches. For example, the twine tails would extend the distance shown in FIG. 10A under conditions where the twine was cut with the twine tubes in the phantom position shown in FIG. 10B. Twine arms 81, 82 then return to home position, illustrated in solid lines in FIG. 10B, and the net dispensing assembly returns to its fully retracted position shown in FIG. 4A, as discussed above, returning knife 48 to its severing position, by virtue of coupling link 52.

In summary, included among the many advantages, explicit and implicit, of the unique apparatus described herein is the provision of a round baler with overall enhanced operation due to the incorporation of wrapping apparatus comprising a net dispensing assembly, a twine dispensing assembly, and a severing assembly, all three of which cooperate in a manner that provides separate or concurrent twine/net wrapping with minimal time requirements. Particularly, when net and twine are applied concurrently is there an improvement in time requirements in that dual simultaneous operation is substituted for similar sequential operations.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. A round baler for forming crop material into cylindrical bales, said baler having a main frame including opposing sidewalls, means defining a bale forming chamber having a generally cylindrical shape with a transverse inlet, said defining means including an apron assembly comprising crop engaging means disposed between said sidewalls, means for supporting said apron assembly on said main frame, means for moving said crop engaging means along a path contiguous with a portion of the periphery of said cylindrical chamber, means for feeding crop material to said chamber through said inlet whereby said crop material accumulated in said chamber is engaged by said crop engaging means under conditions where said crop material engaging means are moving along a portion of said periphery to engage said crop material and form it into a compacted cylindrical package in said chamber, a supply of continuous net material, a dispensing assembly for selectively dispensing said net material into said chamber for wrapping the periphery of said cylindrical package of crop material to form a round bale of crop material, a supply of twine, a twine dispensing assembly for selectively dispensing said twine into said chamber for wrapping the periphery of said cylindrical package of crop material to form a round bale of crop material, and means for cutting said net material while said twine is being dispensed into said chamber, said cutting means comprise a transverse knife for severing said net material after a predetermined amount has been dispensed about the peripheral surface of said compacted cylindrical package of crop material, said cutting means further comprise a transverse shear bar including a shearing edge, means for moving said knife into cooperative engagement with said shearing edge of said shearbar for severing said net material, and means for mounting said means for moving said knife to move said knife into said cooperative engagement with said shearing edge of said shearbar to sever said net material, the improvement comprising said shearbar includes at least one indentation, and said twine dispensing assembly includes means for guiding said twine through said at least one indentation while said knife is moved into cooperation with said shearing edge to sever said net material.

2. A round baler as set forth in claim 1 wherein said indentation comprises an interruption of said shearing edge, and said means for guiding said twine is mounted to guide said twine over the noninterrupted portion of said edge of said shearbar under subsequent conditions where said knife is moved into cooperation with said shearing edge to cut said twine.

3. A round baler as set forth in claim 1 wherein said at least one indentation comprises a notch in said shearbar edge to receive said twine.

4. A round baler for forming crop material into cylindrical bales, said baler having a main frame including opposing sidewalls, means defining a bale forming chamber having a generally cylindrical shape with a transverse inlet, said defining means including an apron assembly comprising crop engaging means disposed between said sidewalls, means for supporting said apron assembly on said main frame, means for moving said crop engaging means along a path contiguous with a portion of the periphery of said cylindrical chamber, means for feeding crop material to said chamber through said inlet whereby said crop material accumulated in said chamber is engaged by said crop engaging means under conditions where said crop material engaging means are moving along a portion of said periphery to engage said crop material and form it into a compacted cylindrical package in said chamber, a supply of continuous net material, a dispensing assembly for selectively dispensing said net material into said chamber for wrapping the periphery of said cylindrical package of crop material to form a round bale of crop material, a supply of twine, a twine dispensing assembly for selectively dispensing said twine into said chamber for wrapping the periphery of said cylindrical package of crop material to form a round bale of crop material, and means for cutting said net material while said twine is being dispensed into said chamber, said twine dispensing assembly includes first and second means for dispensing first and second strands of twine, said cutting means comprise a transverse knife for severing said net material after a predetermined amount has been dispensed about the peripheral surface of said compacted cylindrical package of crop material, a transverse shear bar including a shearing edge, and means for moving said knife into cooperative engagement with said shearing edge of said shearbar for severing said net material, the improvement comprising said shearbar includes at least two indentations, and said twine dispensing assembly includes means for guiding said first and second strands of twine through said at least two indentations while said knife is moved into cooperation with said shear edge to cut said net material.

5. A round baler as set forth in claim 4 wherein said at least two indentations comprise notches in said shearbar edge to receive said twine.

6. A round baler as set forth in claim 4 wherein said indentations comprise interruptions of said shearing edge, and said means for guiding said twine is mounted to guide said twine over the noninterrupted portion of said edge of said shearbar under subsequent conditions where said knife is moved into cooperation with said shearing edge to cut said twines.

* * * * *